United States Patent
Degeneve et al.

(10) Patent No.: US 10,860,747 B2
(45) Date of Patent: Dec. 8, 2020

(54) METHOD FOR TRANSMITTING AND CHECKING THE VALIDITY OF CONFIGURATION DATA IN AN ELECTRONIC SYSTEM, AND ASSOCIATED ELECTRONIC SYSTEM AND COMPUTER PROGRAM PRODUCT

(71) Applicant: ALSTOM Transport Technologies, Saint-Ouen (FR)

(72) Inventors: Xavier Degeneve, Lyons (FR); Cedric Bregardis, Lyons (FR); Matthieu Quadrini, Sauviat (FR); Rafael Fernandez-Valbon, Lyons (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 271 days.

(21) Appl. No.: 16/124,361

(22) Filed: Sep. 7, 2018

(65) Prior Publication Data

US 2019/0080117 A1    Mar. 14, 2019

(30) Foreign Application Priority Data

Sep. 8, 2017  (FR) ...................................... 17 58290

(51) Int. Cl.
*G06F 21/76* (2013.01)
*G06F 21/57* (2013.01)
(Continued)

(52) U.S. Cl.
CPC .......... *G06F 21/76* (2013.01); *G06F 9/44505* (2013.01); *G06F 21/00* (2013.01);
(Continued)

(58) Field of Classification Search
CPC ........ G06F 21/76; G06F 21/00; G06F 21/572; G06F 9/44505; G06F 21/64; G06F 21/575; G06F 30/398
See application file for complete search history.

(56) References Cited

U.S. PATENT DOCUMENTS 6,360,334 B1   3/2002  Kavanagh et al.
7,818,465 B2   10/2010 Chen et al.
(Continued)

FOREIGN PATENT DOCUMENTS

DE    102007053078 A1    3/2009
DE    10 2009 058 754 A1  6/2011
(Continued)

OTHER PUBLICATIONS

Search Report for French Patent Application No. 17 58290 dated May 22, 2018.

*Primary Examiner* — Huan V Doan
(74) *Attorney, Agent, or Firm* — Pearne & Gordon LLP

(57) ABSTRACT

This method comprises the steps of generating an elementary signature for each electronic board from stored configuration data, transmission to each electronic board of the elementary signature, calculation by each electronic board of the signature variable as a function of the configuration variables, and checking by each electronic board of the validity of the stored configuration variables using the received elementary signature and the signature variable. The method comprises the implementation step for each electronic board for which the configuration variables are considered invalid, and comprises the retrieval of the configuration data specific to this board, and the modification of the configuration variables starting from the configuration data retrieved.

12 Claims, 2 Drawing Sheets

(51) Int. Cl.
*G06F 21/00* (2013.01)
*G06F 9/445* (2018.01)
*G06F 21/64* (2013.01)

(52) U.S. Cl.
CPC ............ *G06F 21/572* (2013.01); *G06F 21/64* (2013.01); *G06F 21/575* (2013.01)

(56) References Cited

U.S. PATENT DOCUMENTS

| | | | |
|---|---|---|---|
| 10,326,651 B1 * | 6/2019 | Johnson | .............. H04L 41/0893 |
| 2003/0200026 A1 | 10/2003 | Pearson | |
| 2004/0163019 A1 | 8/2004 | Elfering et al. | |
| 2004/0215569 A1 | 10/2004 | Agha et al. | |
| 2008/0216067 A1 | 9/2008 | Villing | |
| 2012/0185637 A1 | 7/2012 | Boecker et al. | |
| 2013/0067236 A1 * | 3/2013 | Russo | ..................... G06F 21/72 |
| | | | 713/189 |
| 2014/0032916 A1 | 1/2014 | Costin et al. | |
| 2017/0076085 A1 | 3/2017 | Miura | |

FOREIGN PATENT DOCUMENTS

| | | |
|---|---|---|
| EP | 3169035 A1 | 5/2017 |
| WO | 2013037578 A1 | 3/2013 |

\* cited by examiner

METHOD FOR TRANSMITTING AND CHECKING THE VALIDITY OF CONFIGURATION DATA IN AN ELECTRONIC SYSTEM, AND ASSOCIATED ELECTRONIC SYSTEM AND COMPUTER PROGRAM PRODUCT

FIELD OF THE INVENTION

The present invention relates to a method for transmitting and checking the validity of configuration data in an electronic system, and an associated electronic system and computer program product.

BACKGROUND OF THE INVENTION

In the prior art, it is known to use electronic systems with centralized storage of configuration data. The configuration data are intended for different modules or electronic boards constituting these systems.

Among these systems, mention may be made, in particular, of certain equipment on board a railway vehicle, such as, for example, a communication console with the operator of the railway vehicle, traction equipment, network equipment, equipment that operates the outputs or reads the inputs. Mention may also be made of certain ground equipment along the tracks of a railway system, in particular signaling equipment, such as equipment that interfaces with objects on the track (signal lights, switching, level crossing, track circuit, beacons).

The configuration data are necessary for the operation of the corresponding modules or electronic boards, and are stored in a centralized storage module provided for this purpose.

When an electronic system with centralized storage of configuration data has a high level of criticality, the configuration data are stored in the form of a secure data structure.

This structure is associated with a signature that checks the validity of the corresponding configuration data. Checking the validity of the data includes checking the authenticity, integrity and consistency of the data.

In general, the validity of the configuration data is checked at each booting of the corresponding electronic system.

In particular, during such a booting, one of the electronic boards of the electronic system extracts the set of configuration data from the storage module and checks the validity of this data.

When the validity has been checked, the electronic board transmits the configuration data corresponding to these boards to the other electronic boards.

Upon receipt of the corresponding configuration data, each electronic board stores this data in its internal memory and checks the integrity and consistency.

The electronic system is operational when each board has received, checked and stored the corresponding configuration data.

Such a method of booting an electronic system with centralized storage of configuration data may be particularly slow and inadequate when it is necessary to reboot the system often and/or when the system has a large number of modules or electronic boards. Thus, for example, the duration of the booting of an electronic system according to this method may take up to 30 minutes when the system comprises, for example, 50 electronic boards.

SUMMARY OF THE INVENTION

The object of the present invention is to overcome this disadvantage of the prior art by proposing an electronic system and a method for transmitting and checking the validity of the configuration data implemented by this system, thus making it possible to considerably reduce the time for re-booting such a system.

To this end, the object of the invention is a method for transmitting and checking the validity of configuration data in an electronic system with centralized storage of the configuration data, wherein the electronic system comprises a plurality of electronic boards capable of implementing the operation of the electronic system using configuration data specific to each of these boards, and a centralized storage module capable of centrally storing the configuration data for all the electronic boards, wherein each electronic board comprises an internal memory designed to memorize a signature variable and configuration variables.

The method comprises the following steps:
generation of a basic signature for each of the electronic boards from the configuration data stored in the centralized storage module;
transmission to each electronic board of the elementary signature specific to this board;
calculation by each electronic board of the signature variable as a function of the configuration variables stored in the internal memory of this electronic board;
checking by each electronic board of the validity of the configuration variables stored in the internal memory of this board using the elementary signature received and the signature variable;
and wherein the method comprises the following step implemented for each electronic board, for which the configuration variables are considered to be invalid during the step of checking the validity of the configuration variables:
retrieving the configuration data specific to this board and modifying the configuration variables from the retrieved configuration data.

According to other advantageous aspects of the invention, the method comprises one or more of the following characteristics, taken separately or in any technically feasible combination:
each elementary signature is generated by only one of the electronic boards using the configuration data specific to each of the electronic boards stored in the centralized storage module;
the configuration data is stored in the form of a secure data structure associated with a global signature;
prior to the generation step, the method comprises the step of checking the validity of the configuration data of the data structure by using the global signature associated with this structure, wherein, if the validity of the configuration data has been checked, the generation step is performed, while the transmission step also includes transmitting the global signature to each electronic board;
the set of elementary signatures and the global signature are stored in the internal memory of one of the electronic boards that is referred to as the main board;
the steps of checking the validity of the configuration data and of generating an elementary signature for each of the electronic boards are implemented by the main board;

in the step of retrieving the configuration data, checking that the retrieved configuration data corresponds to the elementary signature is performed, and then the configuration variables are modified starting from the retrieved configuration data in order to store the retrieved configuration data in internal memory of the board;

for each electronic board, for which the configuration variables are considered valid during the step of checking the validity of the configuration variables, the method comprises:

retrieval by the electronic board of the configuration variables from the internal memory of this board;

wherein the step of retrieving the configuration data further comprises:

the retrieval by the corresponding electronic board of the configuration variables from the internal memory of this board;

the method comprises the following steps:

replacing an electronic board in the electronic system by a new electronic board;

generation of an elementary signature for at least the new electronic board from the configuration data stored in the centralized storage module;

transmission of the elementary signature to at least the new electronic board; and performing the checking step of the configuration variables for the new electronic board.

The invention also relates to a computer program product comprising software instructions which, when implemented by computer equipment, implement the method as defined above.

The invention also relates to an electronic system with centralized storage of the configuration data, wherein the electronic system comprises a plurality of electronic boards able to implement the operation of the electronic system by using configuration data specific to each of these boards and a centralized storage module that is able to centrally store the configuration data for all the electronic boards, wherein each electronic board comprises an internal memory capable of storing a signature variable and configuration variables; while the electronic system comprises means that implement the method as previously described.

BRIEF DESCRIPTION OF THE DRAWINGS

These features and advantages of the invention will become apparent upon reading the description which follows, given solely by way of a non-limiting example, and with reference to the appended drawings, wherein.

DETAILED DESCRIPTION OF THE INVENTION

Figure 1:
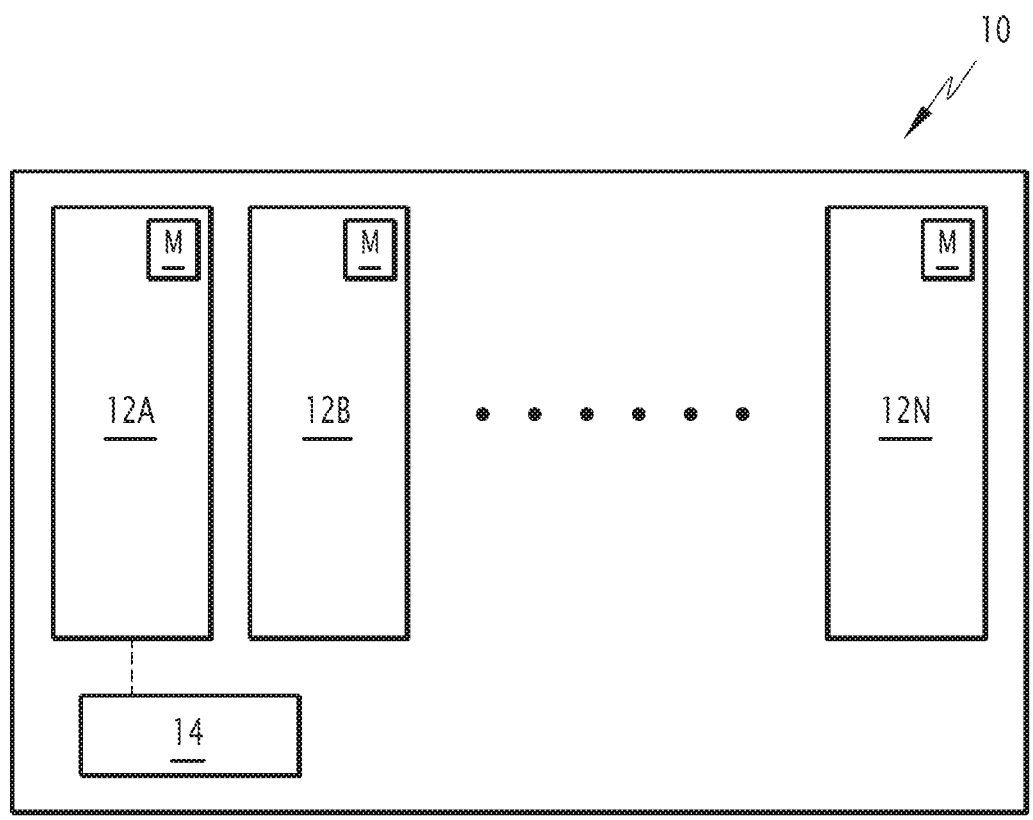
FIG. 1 shows a schematic view of an electronic system according to the invention, wherein the system comprises, in particular, a centralized storage module.

The electronic system 10 of FIG. 1 comprises a plurality of electronic boards 12A to 12N implementing the operation of the system 10, and a centralized storage module 14.

The electronic system 10 may be used, in particular, in the railway field and has, for example, equipment on board a railway vehicle, such as a communication console for the operator of the vehicle.

Each electronic board 12A to 12N provides a service for the electronic system 10 using configuration data specific to that board. In other words, the configuration data defines the service provided by the corresponding electronic board 12A to 12N in response to various events occurring in the system 10.

Each electronic board 12A to 12N is, for example, in the form of a programmable logic circuit comprising, in particular, an internal memory M. Such a programmable logic circuit is, for example, of the FPGA (Field-Programmable Gate Array) type.

The internal memory M may have the property of retaining the stored information even when the memory is not powered electrically.

The internal memory is able to store a signature variable and configuration variables.

The signature variable corresponds to an elementary signature of the configuration variables.

The configuration variables correspond to configuration data retrieved by the electronic board 12A to 12N as will be explained later.

According to an alternative embodiment, at least some of the electronic boards have a more complex form, for example in the form of a mini-computer comprising a processor and an internal memory.

According to an alternative embodiment, at least some of the electronic boards are replaceable. In this case, the electronic system 10 is said to be flexible.

According to an alternative embodiment, at least some of the electronic boards may be hot-swapped without disturbing the operation of the other boards of the system (except the communications/service of the board being replaced). In this case, the electronic system 10 is said to be modulable hot or in operation.

Figure 2:
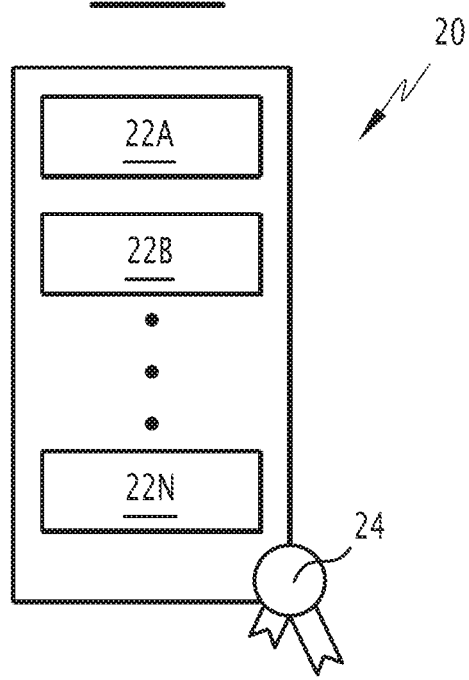
FIG. 2 shows a schematic view of a data structure stored in the storage module of FIG. 1.

The configuration data of all of the boards 12A-12N are stored at least initially in the centralized storage module 14 in the form of a secure data structure which is further illustrated in FIG. 2.

Thus, with reference to FIG. 2, the data structure 20 comprises a plurality of configuration data blocks 22A to 22N respectively associated with the electronic boards 12A to 12N.

Each of these data blocks 22A to 22N comprises configuration data specific to the electronic board 12A to 12N associated with this block.

The data structure 20 is associated with a global signature 24 making it possible to check the validity of the data contained in this structure.

The global signature 24 is, for example, stored in the centralized storage module 14 with the data structure 20.

The overall signature 24 is, for example, determined from the data contained in the structure 20 according to methods known per se.

The configuration data may be modified, for example, by a user in order to modify the operation of the on-board system 10. Thus, in the previous example of the communication console for the operator, the modification of the configuration data makes it possible, for example, to activate new messages for the operator.

When the configuration data are modified, the global signature 24 is also modified.

The centralized storage module 14 is connected to one of the electronic boards 12A to 12N, for example to the electronic board 12A, hereinafter called the main board.

Figure 3:
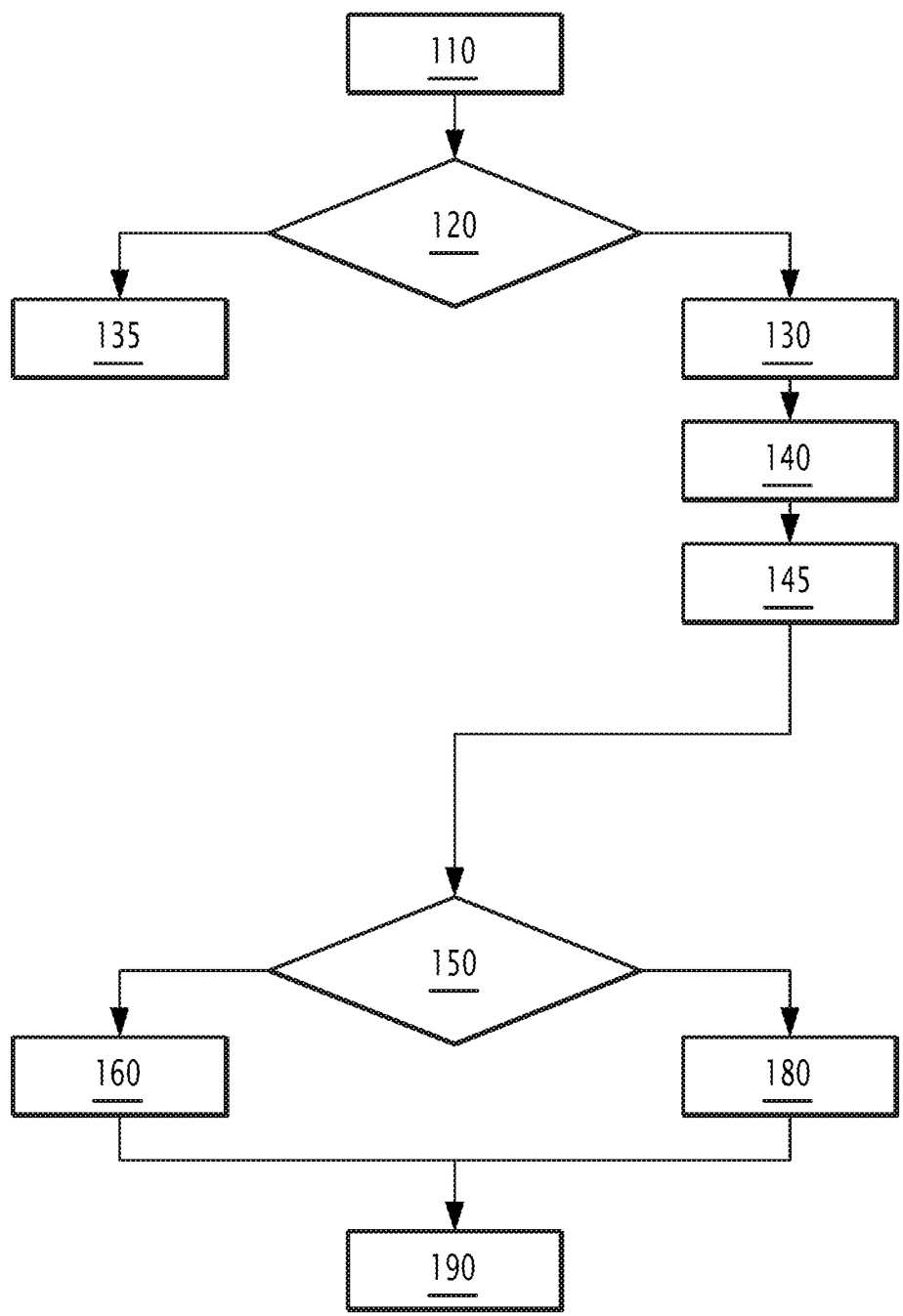
FIG. 3 shows a flowchart of a method for transmitting and checking the validity of configuration data in the electronic system of FIG. 1.

The main board 12A makes it possible to implement a method for transmitting and checking the validity of the configuration data from the centralized storage module 14 which will be described later with reference to FIG. 3 illustrating a flowchart of the steps involved.

In particular, the method for transmitting and checking the validity of the configuration data corresponds to a booting phase PR of the electronic system 10.

This booting phase PR is then implemented at the initial booting of the electronic system 10 and each subsequent re-booting.

During the initial step 110 of the booting phase PR, the electronic system 10 receives an initial booting or re-booting command. It should be noted that the command so received does not indicate whether the booting is initial, or with modified configuration data or not.

The electronic system 10 then activates the operation of all the electronic boards 12A to 12N and, in particular, the operation of the main board 12A.

In the next step 120, the main board 12A extracts the data structure 20 from the storage module 14.

Then, the main board 12A checks the validity of the configuration data from the data structure 20.

Checking the validity of the configuration data includes checking the authenticity, integrity and consistency of these data.

To check the validity, the main board 12A generates, for example, a global signature SG from the configuration data received, using the same methods as those used to determine the overall signature 24 associated with the data structure 20.

Then, the main board 12A compares the generated global signature SG with the signature 24 associated with the data structure 20.

When the two signatures coincide, the main board 12A proceeds to step 130. In the opposite case, the main board 12A proceeds to step 135 during which it generates an error message intended, for example, for the user, and interrupts the execution of the PR booting phase.

In step 130, the main board 12A generates an elementary signature SE for each of the electronic boards 12A to 12N.

Such an elementary signature SE for a given electronic board 12A to 12N is, for example, generated from the configuration data specific to this electronic board 12A to 12N, using, for example, methods similar to those used to generate the global signature SG.

In the next step 140, the main board 12A stores the generated elementary signatures SE and the generated global signature SG in its internal memory M.

Then, during the same step 140, the main board 12A makes available to each electronic board 12A to 12N the elementary signatures SE generated, as well as the configuration data specific to this board 12A to 12N.

Then, each electronic board 12A to 12N retrieves the elementary signature associated with it by the main board 12A.

In the next step 145, each board 12A to 12N calculates its elementary signature SE from the configuration variables stored in its internal memory M, using, for example, methods similar to those used to generate the global signature SG, and fixes the signature variable equal to the calculated value of the elementary signature.

In the next step 150, each electronic board 12A to 12N compares the retrieved elementary signature SE with the signature variable it has in its internal memory M (note that if no information has been stored in this memory M beforehand, the board will behave as if the signature variable is different and the data is not valid).

Then, each electronic board 12A to 12N checks the validity of the configuration variables stored in its internal memory M using the retrieved elementary signature SE and the signature variable.

To check the validity of the corresponding configuration variables, each electronic board 12A to 12N compares the signature variable with the elementary signature SE retrieved.

If the elementary signature SE coincides with the signature variable, the corresponding electronic board 12A to 12N validates the configuration variables, and the board 12A to 12N goes to step 180. In the opposite case, the corresponding electronic board 12A to 12N goes to step 160.

In step 180, the corresponding board 12A to 12N retrieves the configuration variables from its internal memory M and, for example, sets up these variables to be operational.

In step 160, the board 12A to 12N retrieves the configuration data associated with it and made available by the main board 12A, calculates the signature SE of the received data, and checks that it coincides with the signature SE so made available.

Then, the corresponding board 12A to 12N sets the signature variable equal to the elementary signature SE that has been calculated or retrieved, and sets the configuration variables equal to the retrieved configuration data.

At the end of this step 160, the corresponding board 12A to 12N retrieves the configuration variables from its internal memory and, for example, sets these variables to be operational.

Thus, after steps 160 and 180, each board 12A to 12N has its configuration data and SE signature and has a copy of the configuration data and associated signature in its memory M.

Step 190 is the final step of the booting phase PR, following which the electronic system 20 is operational.

Advantageously, following step 180, the boards 12B to 12N periodically check that the configuration data used are authorized. To do this, they check that the elementary signature SE used, i.e. the signature variable, is always the same as that made available by the main board 12A.

If this is not the case, the board generates an error message intended, for example, for the user and interrupts the execution, or returns to step 160 to retrieve the new configuration data (this choice depends on the function provided, for example if this involves a safety function, the product will go into a safe state).

Advantageously, the method greatly simplifies the replacement of an electronic board 12B, . . . 12N in the electronic system 10, by a new electronic board.

In this case, the method further comprises the following steps:
- replacement of an electronic board 12B, . . . 12N in the electronic system 10 by a new electronic board;
- generation of an elementary signature SE for at least the new electronic board from the configuration data stored in the centralized storage module 14;
- transmission of the elementary signature SE at least to the new electronic board; and
- performance of the step 150 checking the configuration variables for the new electronic board.

It is thus clear that the invention offers a number of advantages.

In fact, the method of transmission and checking of the validity of configuration data according to the invention makes it possible to boot the electronic system in a particularly fast manner because only the data not present will be sent.

In particular, during the re-booting phase of the electronic system 10, the configuration data, when they are unchanged, are not transmitted again to the corresponding electronic boards.

The validity of these data is checked by using the corresponding elementary signatures which are transmitted to the corresponding electronic boards in a particularly rapid manner.

The validity of these data is checked periodically using the corresponding elementary signatures, wherein this ensures that a configuration change is effected (or that the appropriate actions will be performed).

This then considerably reduces the execution time of the re-booting phase and thus the total re-booting time of the electronic system.

The invention claimed is:

1. A method for transmitting and checking the validity of configuration data in an electronic system with centralized storage of the configuration data, the electronic system comprising a plurality of electronic boards able to implement the operation of the electronic system using configuration data specific to each electronic board and a centralized storage module able to centrally store the configuration data for the plurality of electronic boards, each electronic board comprising an internal memory designed to store a signature variable and configuration variables, the method comprising the following steps:
generating an elementary signature for each electronic board from the configuration data stored in the centralized storage module;
transmitting, to each electronic board, the elementary signature specific to the each electronic board;
calculating, by each electronic board, the signature variable according to the configuration variables stored in the internal memory of the each electronic board;
checking, by each electronic board, the validity of the configuration variables stored in the internal memory of the each electronic board using the received elementary signature and the signature variable; and
for each electronic board, during the step of checking the validity of the configuration variables, when the configuration variables are invalid, retrieving the configuration data specific to the each electronic board and modifying the configuration variables starting from the retrieved configuration data.

2. The method according to claim 1, wherein the elementary signature is generated by only one of the plurality of electronic boards using the configuration data specific to each electronic board and stored in the centralized storage module.

3. The method according to claim 1, wherein the configuration data is stored as a secure data structure associated with a global signature.

4. The method according to claim 3, wherein the method comprises the following step before the step of generating:
checking the validity of the configuration data of the data structure by using the global signature associated with this structure; and
the step of generating is performed if the validity of the configuration data is checked.

5. The method according to claim 4, wherein, following the generating step, elementary signatures of the plurality of electronic boards and the global signature are stored in the internal memory of one of the plurality of electronic boards, referred to as the main board.

6. The method according to claim 5, wherein the steps of checking the validity of the configuration data and of generating an elementary signature for each of the plurality of electronic boards, are implemented by the main board.

7. The method according to claim 1, wherein checking that the retrieved configuration data corresponds to the elementary signature is performed in the step of retrieving the configuration data, and then the configuration variables are modified from the retrieved configuration data in order to store the retrieved configuration data in the internal memory of the each electronic board.

8. The method according to claim 1, wherein the method comprises, for each electronic board, when the configuration variables are considered valid during the step of checking the validity of the configuration variables:
retrieving the configuration variables by the each electronic board from the internal memory of the each electronic board.

9. The method according to claim 1, wherein the step of retrieving the configuration data further comprises:
retrieving, by the each electronic board, configuration variables from the internal memory of this the each electronic board.

10. The method according to claim 1, wherein the method comprises the following steps:
replacing an electronic board in the electronic system by a new electronic board;
generating a new elementary signature for at the new electronic board from the configuration data stored in the centralized storage module;
transmitting the new elementary signature to the new electronic board; and
checking the configuration variables for the new electronic board.

11. A computer program product comprising non-transitory computer storage medium storing software instructions which, when implemented by computer equipment, implement the method comprising the following steps:
generating an elementary signature for each electronic board from the configuration data stored in the centralized storage module;
transmitting, to each electronic board, the elementary signature specific to the each electronic board;
calculating, by each electronic board, the signature variable according to the configuration variables stored in the internal memory of the each electronic board;
checking, by each electronic board, the validity of the configuration variables stored in the internal memory of the each electronic board using the received elementary signature and the signature variable; and
for each electronic board, when the configuration variables are invalid, retrieving the configuration data specific to the each electronic board and modifying the configuration variables starting from the retrieved configuration data.

12. An electronic system with centralized storage of the configuration data, the electronic system comprising:
a plurality of electronic boards;
wherein the plurality of electronic boards implement the operation of the electronic system using configuration data specific to each of these boards, and a centralized storage module able to store the configuration data centrally for all the electronic boards, each electronic board comprising an internal memory designed to store a signature variable and configuration variables;

wherein the electronic system being configured to:
- generate an elementary signature for each electronic board from the configuration data stored in the centralized storage module;
- transmit, to each electronic board, the elementary signature specific to the each electronic board;
- calculate, by each electronic board, the signature variable according to the configuration variables stored in the internal memory of the each electronic board;
- check, by each electronic board, the validity of the configuration variables stored in the internal memory of the each electronic board using the received elementary signature and the signature variable; and
- for each electronic board, when the configuration variables are invalid, retrieve the configuration data specific to the each electronic board and modify the configuration variables starting from the retrieved configuration data.

* * * * *